April 5, 1949.  R. S. GAUGLER  2,466,541
GAS AND LIQUID CONTACT APPARATUS
Filed Nov. 17, 1943  8 Sheets-Sheet 1

INVENTOR
Richard S. Gaugler
BY
Spencer Hardman and Fehr
Attorneys

April 5, 1949. R. S. GAUGLER 2,466,541
GAS AND LIQUID CONTACT APPARATUS
Filed Nov. 17, 1943 8 Sheets-Sheet 2

Key To Figs. 1 & 2

Fig. 14 {
→ Rich Liquor
→ Weak Liquor
--→ Hydrogen Gas
--→ Ammonia Vapor & Liquid
--→ Ammonia Vapor Plus Hydrogen Gas
}

INVENTOR.
Richard S. Gaugler
BY
Spencer Hardman and Fehr
Attorneys

April 5, 1949.  R. S. GAUGLER  2,466,541

GAS AND LIQUID CONTACT APPARATUS

Filed Nov. 17, 1943  8 Sheets-Sheet 3

INVENTOR.
Richard S. Gaugler
BY
Spencer Hardman and Fehr
Attorneys

April 5, 1949.　　　R. S. GAUGLER　　　2,466,541
GAS AND LIQUID CONTACT APPARATUS
Filed Nov. 17, 1943　　　　　　　　　　8 Sheets-Sheet 4
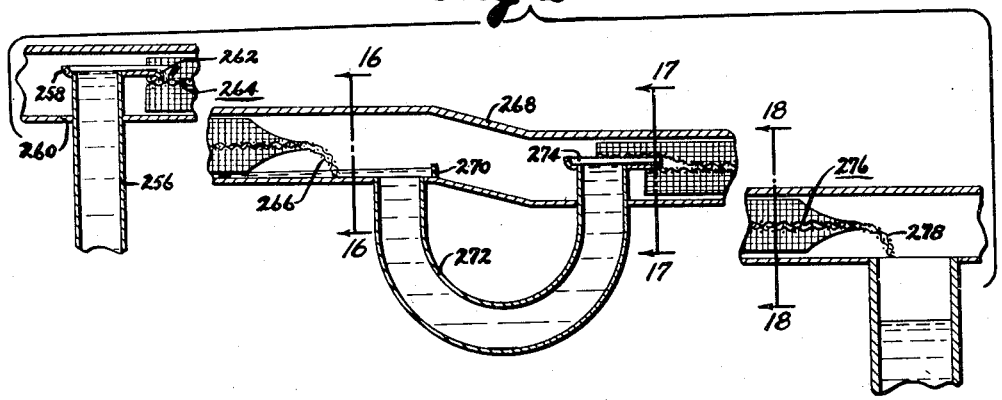
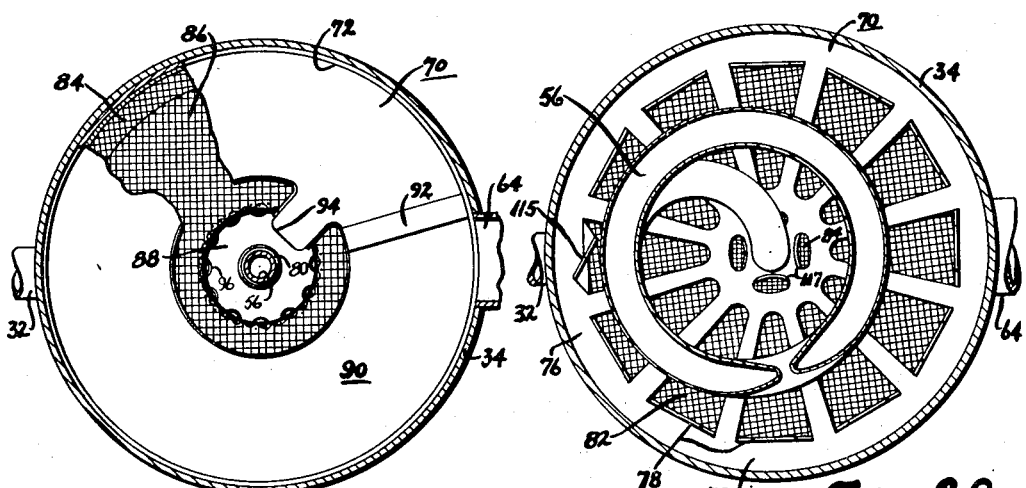
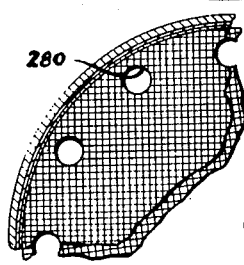
INVENTOR.
Richard S Gaugler
BY
Spencer Hardman and Fehr
Attorneys April 5, 1949.  R. S. GAUGLER  2,466,541
GAS AND LIQUID CONTACT APPARATUS
Filed Nov. 17, 1943  8 Sheets-Sheet 5

INVENTOR.
Richard S. Gaugler
BY
Spencer Hardman and Fehr
Attorneys

April 5, 1949.  R. S. GAUGLER  2,466,541
GAS AND LIQUID CONTACT APPARATUS
Filed Nov. 17, 1943  8 Sheets-Sheet 6

INVENTOR.
Richard S. Gaugler
BY
Spencer Hardman and Fehr
Attorneys

April 5, 1949.  R. S. GAUGLER  2,466,541
GAS AND LIQUID CONTACT APPARATUS
Filed Nov. 17, 1943  8 Sheets-Sheet 7

INVENTOR.
Richard S. Gaugler
BY Spencer Hardman & Fehr
Attorneys

April 5, 1949.  R. S. GAUGLER  2,466,541
GAS AND LIQUID CONTACT APPARATUS

Filed Nov. 17, 1943  8 Sheets—Sheet 8

INVENTOR.
Richard S. Gaugler
BY
Spencer Hardman and Fehr
attorneys

Patented Apr. 5, 1949

2,466,541

UNITED STATES PATENT OFFICE 2,466,541

GAS AND LIQUID CONTACT APPARATUS

Richard S. Gaugler, Dayton, Ohio, assignor to General Motors Corporation, Dayton, Ohio, a corporation of Delaware Application November 17, 1943, Serial No. 510,587

3 Claims. (Cl. 261—100)

This invention relates to gas and liquid contact apparatus such as may be used in absorption refrigeration apparatus and many other applications.

It is an object of my invention to provide an apparatus capable of improving gas and liquid contact in absorption refrigerators.

It is another object of my invention to provide means by which a liquid may have a large surface exposed to gas and yet be housed within a small space.

It is another object of my invention to provide an improved gas and liquid contact apparatus by which the various forms of wire material capable of being manufactured upon a commercial scale may be readily formed to provide large liquid surfaces in contact with gas.

It is another object of my invention to provide a gas and liquid contact apparatus in an absorber whereby different rates of diffusion of the gases aid in providing improved absorption and separation of the refrigerant and inert gas.

It is another object of my invention to provide a fractionator and/or an improved absorber for absorption refrigerators which will be more efficient and smaller.

It is another object of my invention to provide a horizontal or slightly inclined wire screen structure capable of holding a thin liquid film exposed on both sides to gas.

These objects are attained by providing a gas and liquid contact apparatus in the form of matted wire, such as wire screen by which the liquid may flow to all parts of the matted wire and be held therein while the gas is caused to flow along or through the matted wire. Such an arrangement may be used in the absorber in a fractionator and also in the evaporator of an absorption refrigerating apparatus as well as many other applications requiring intimate contact between liquid and gas.

Further objects and advantages of the present invention will be apparent from the following description, reference being had to the accompanying drawings, wherein a preferred form of the present invention is clearly shown.

Figure 1:
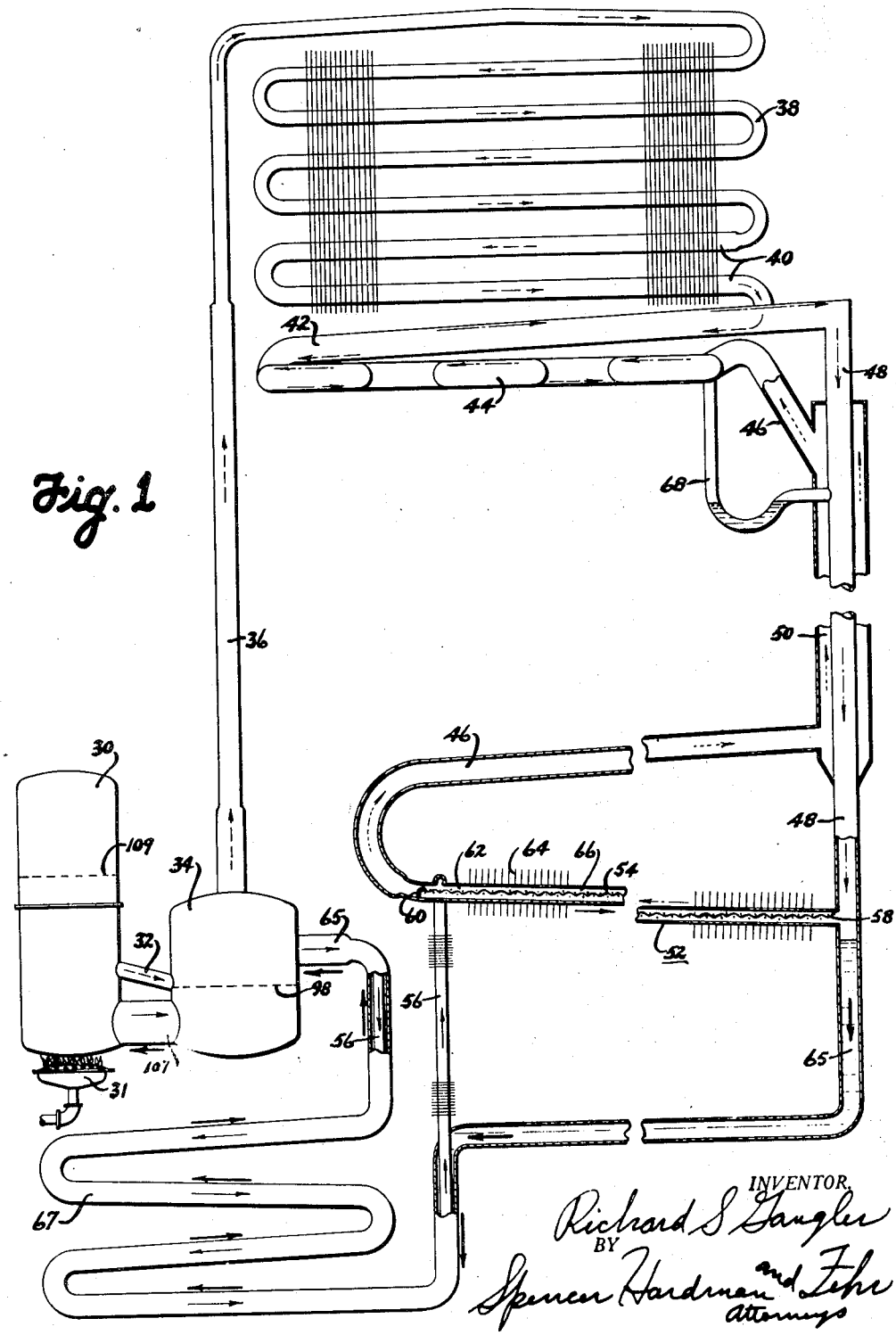
Fig. 1 is a view of an absorption refrigerating system, partly diagrammatic, disclosing one form of my invention.
Figure 2:
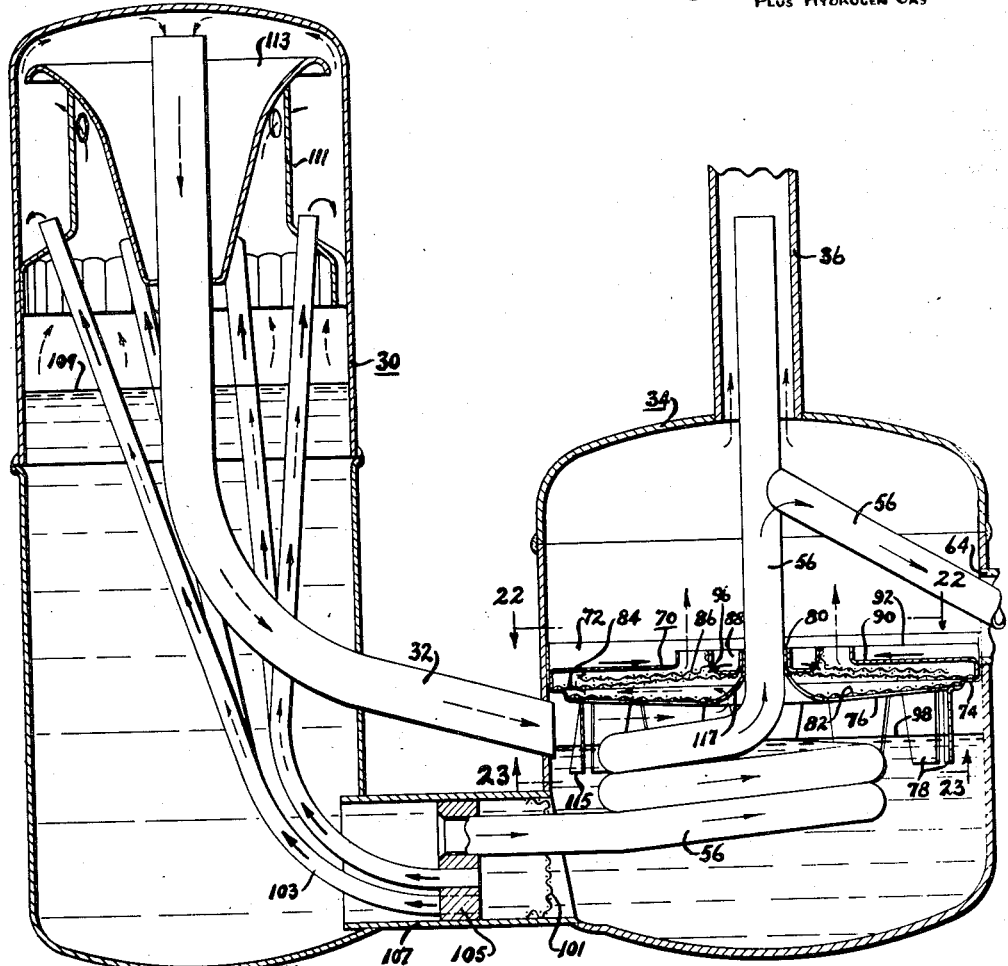
Fig. 2 is a sectional view of the generator, receiver and fractionator, together with a chart indicating the meaning of the various arrows used in Figs. 1 and 2 to show the flow of liquids and gases.
Figure 3:
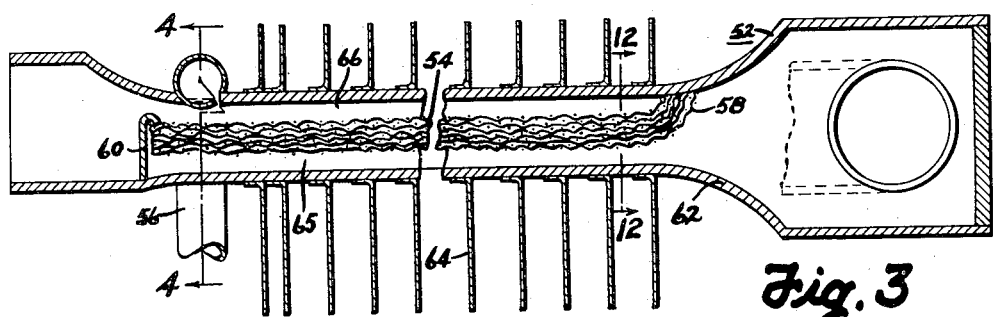
Fig. 3 is an enlarged sectional view of the absorber used in Fig. 1 taken along the line 3—3 of Figs. 4 and 12.
Figure 4:
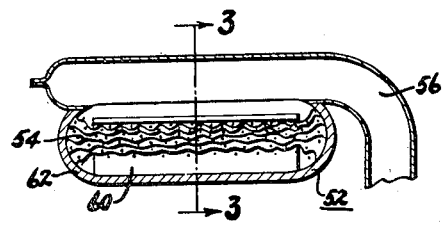
Fig. 4 is a sectional view taken along the line 4—4 of Fig. 3, showing one form of matted wire structure in cross-section.
Figure 13:
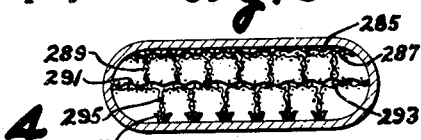
Figure 10:
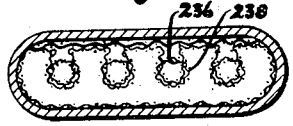
Figure 11:
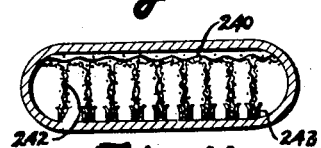
Figure 12:
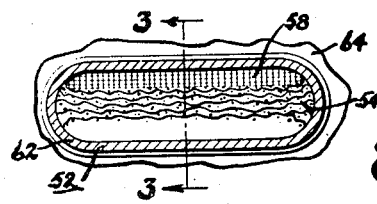
Figure 22:
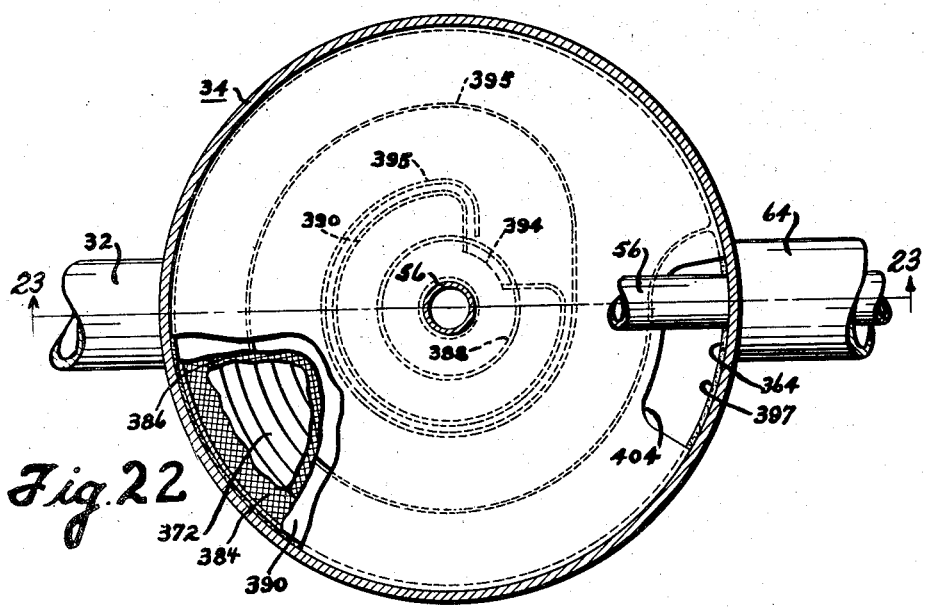
Figure 23:
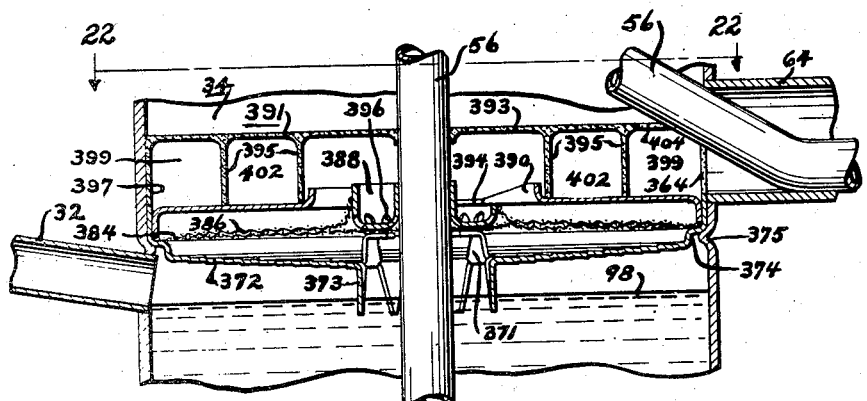
Figure 24:
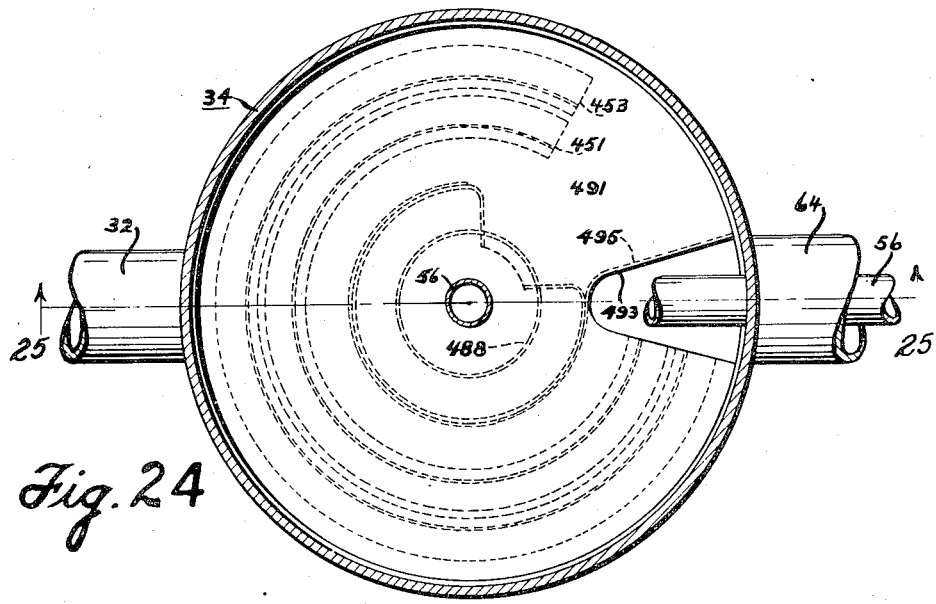
Figure 25:
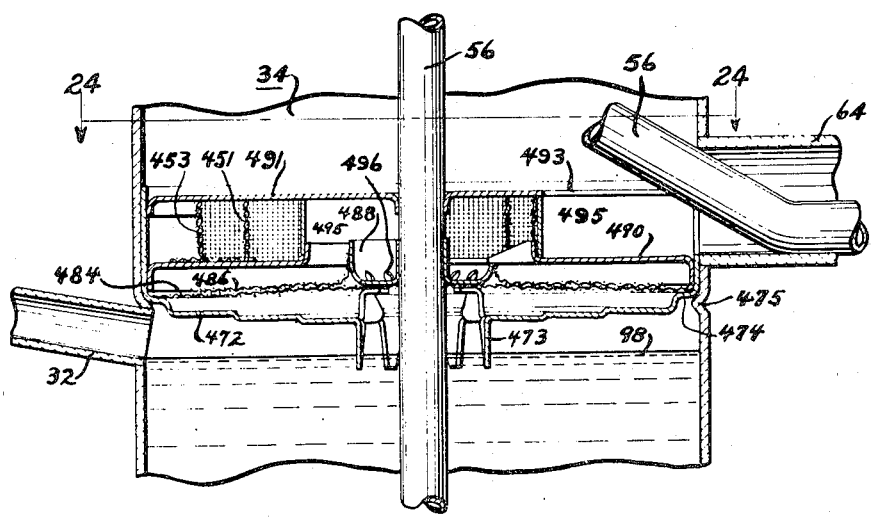
Figure 26:
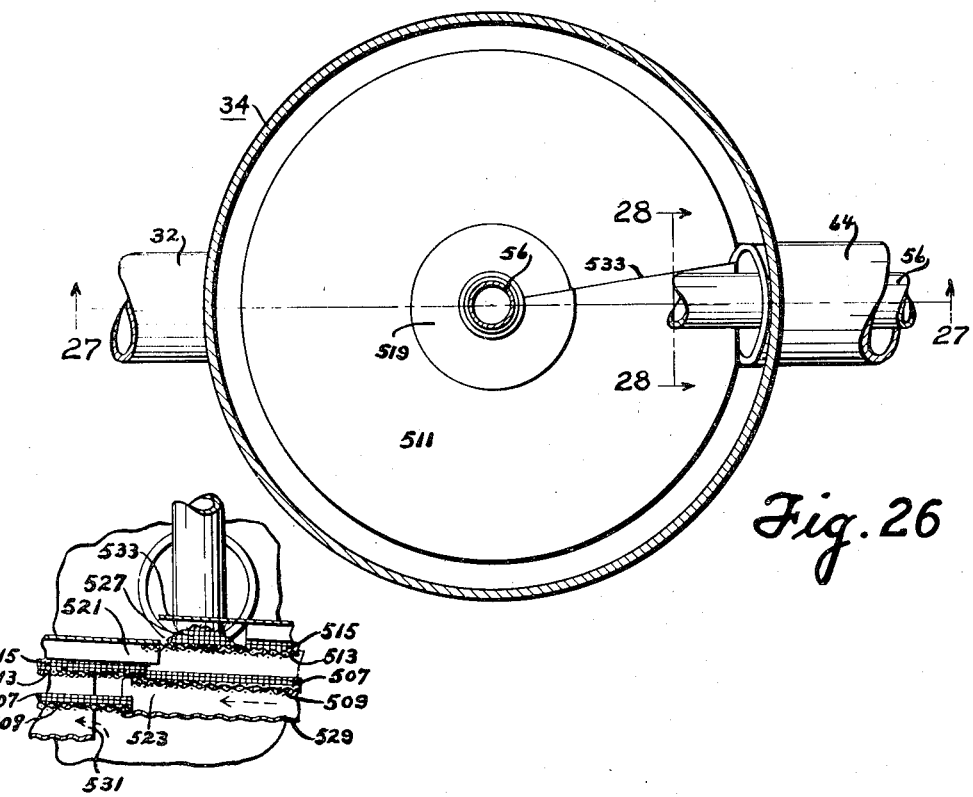
Figure 28:
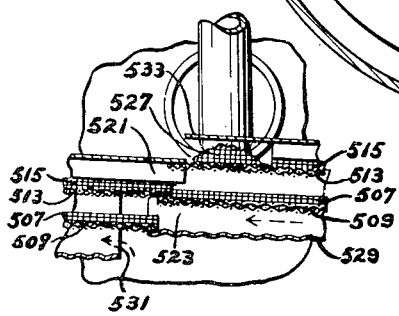
Figure 27:
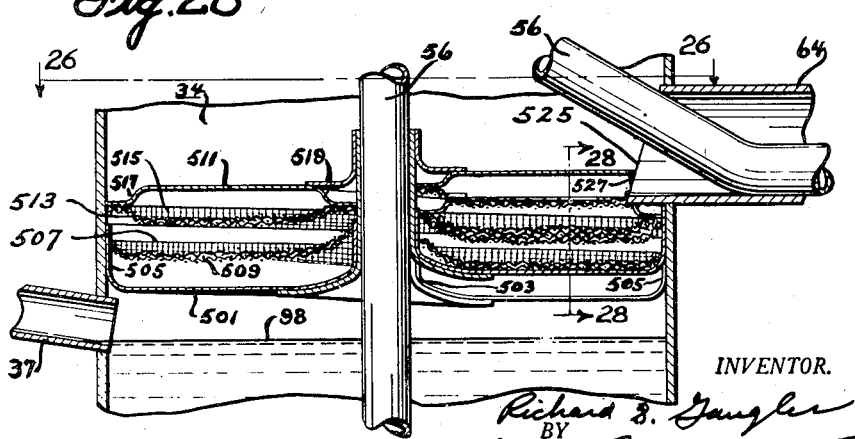
Figure 29:
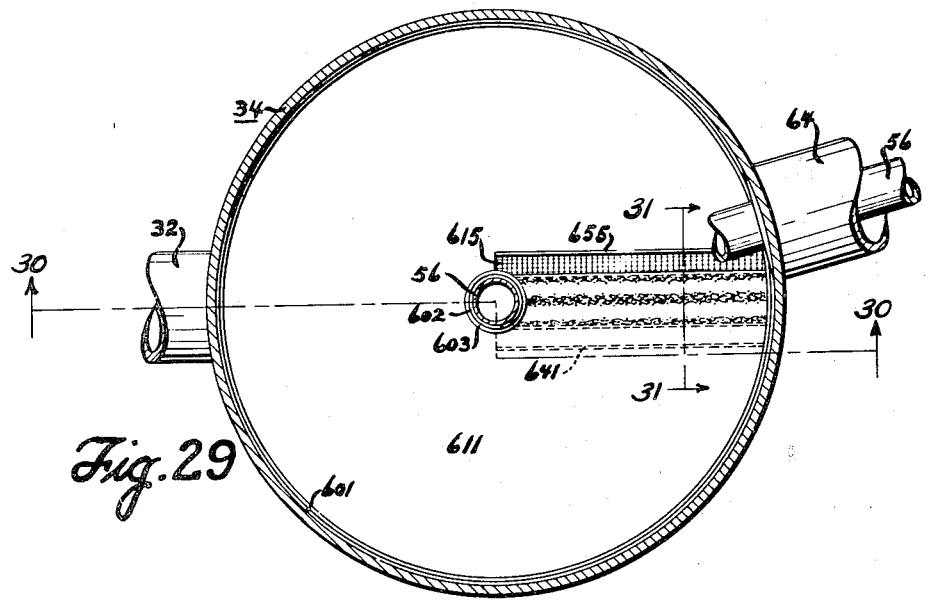
Figure 30:
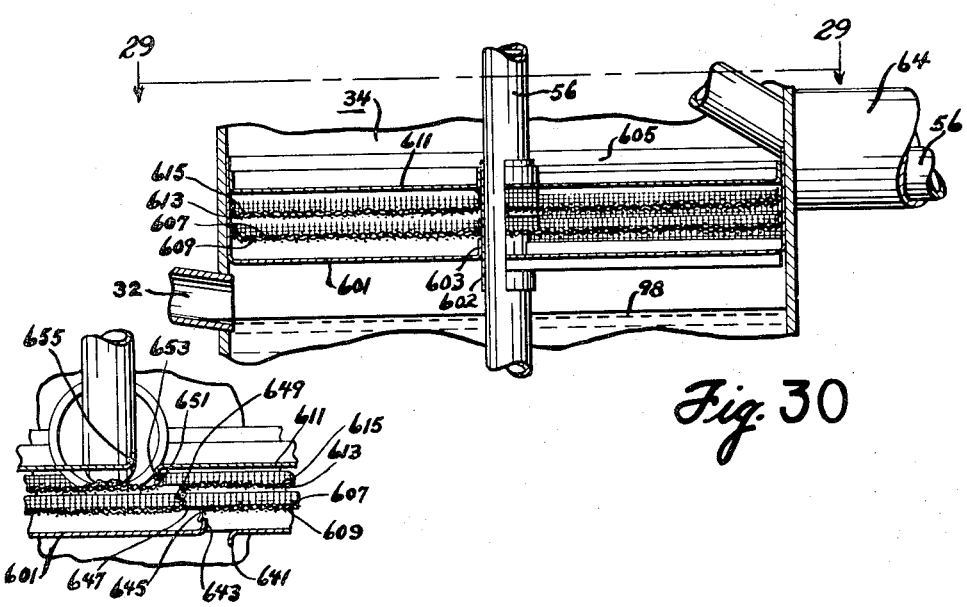

Figs. 5 to 11 inclusive are transverse sectional views of an absorber tube similar to that shown in Figs. 3, 4 and 12 showing various other forms of matted wire gas and liquid contact apparatus;

Fig. 12 is a sectional view taken along the line 12—12 of Fig. 3;

Fig. 13 is a sectional view of an absorber tube similar to that shown in Figs. 3 to 12 inclusive, showing another form of wire screen gas and liquid contact apparatus;

Fig. 14 is a chart giving the key to the flow arrows used in Figs. 1 and 2;

Fig. 15 is a sectional view of another form of absorber showing a method and apparatus which may be used to carry the liquid from one gas and liquid contact apparatus to another;

Fig. 16 is a sectional view taken along the line 16—16 of Fig. 15;

Fig. 17 is a sectional view taken along the line 17—17 of Fig. 15;

Fig. 18 is a sectional view taken along the line 18—18 of Fig. 15;

Fig. 19 is a sectional view taken along the line 19—19 of Fig. 2;

Fig. 20 is a sectional view taken along the line 20—20 of Fig. 2;

Fig. 21 is a fragmentary sectional view somewhat similar to Fig. 19 showing a modified form of fractionator;

Fig. 22 is a horizontal sectional view of a receiver and fractionator tank containing a modified form of fractionator assembly taken along the line 22—22 of Fig. 23;

Fig. 23 is a sectional view taken along the line 23—23 of Fig. 22;

Fig. 24 is a horizontal sectional view through a receiver and fractionator tank containing another modified form of fractionator assembly taken along the line 24—24 of Fig. 25;

Fig. 25 is a sectional view taken along the line 25—25 of Fig. 24;

Fig. 26 is a horizontal sectional view of a receiver and fractionator tank containing another modified form of fractionator assembly taken along the line 26—26 of Fig. 27;

Fig. 27 is a sectional view taken along the line 27—27 of Fig. 26;

Fig. 28 is a sectional view taken along the line 28—28 of Fig. 27;

Fig. 29 is a horizontal sectional view of a receiver and fractionator tank containing another modified form of fractionator assembly taken along the line 29—29 of Fig. 30;

Fig. 30 is a sectional view taken along the line 30—30 of Fig. 29; and

Figure 31:

Fig. 31 is a sectional view taken along the line 31—31 of Fig. 29.

In Fig. 1, there is shown an absorption refrigerating system provided with a generator 30 heated by a gas burner 31 which drives off the refrigerant such as ammonia in vapor form from the liquid in the generator. This vapor is conducted through a vapor tube 32 to a combined receiver and fractionator 34 from which the vapor is conducted upwardly through the conduit 36 to the condenser 38. The condenser 38 has one particularly unusual feature in that the bottom two horizontal tubes 40 are larger to allow more room for the condensed liquid, the vapor and any inert gas which may collect therein. I find by making the tubing in the lower portion of the condenser 38 larger than the tubing of the upper portion that the efficiency of the condenser is increased.

The liquid refrigerant which is condensed in the condenser 38 flows directly into the inclined tubular portion 42 of the evaporator through which the liquid refrigerant flows downwardly to and covers the extreme bottom part of the horizontal portion 44 of the evaporator which is formed into a serpentine shape. Hydrogen through the hydrogen supply tube 46 enters the serpentine portion of the evaporator 44 at the opposite end and flows above and in the opposite direction to the flow of liquid refrigerant throughout both portions of the evaporator. The liquid refrigerant throughout the evaporator evaporates into and diffuses into this hydrogen which accumulates more and more refrigerant vapor as it flows through the entire length of the evaporator. This mixture of ammonia and hydrogen gases is heavier than the hydrogen supplied through the tube 46 and it flows downwardly through the gas tube 48 which extends through the heat exchanger 50 to the lower end of the absorber 52.

The absorber 52 is provided with a gas and liquid contact apparatus 54 in the form of a porous matted wire structure or partition which is kept saturated with weak liquor flowing from the generator 30 through the weak liquor tube 56 which discharges through a distributing slot in the bottom of the tube, as shown in Figs. 1, 3 and 4 onto the upper end of the porous matted wire gas and liquid contact apparatus 54. At the lower end the matted wire is turned upwardly, as shown in 58, to prevent the heavy mixture of ammonia and hydrogen from taking the upper passage 66, while at the opposite end there is provided a block 60 to force the mixture to flow from the lower passage 65 through the matted wire structure 54. In the matted wire structure 54 the weak liquor absorbs the ammonia from the mixture of hydrogen and ammonia.

One principal function of the absorber is to separate ammonia gas from hydrogen gas and to deliver relatively pure hydrogen at the hydrogen discharge end of the absorber. In conventional absorbers this is done exclusively by the absorption of ammonia into the weak ammonia solution. It is known that the rate of diffusion of hydrogen gas through an orifice or a porous partition is far greater than that of ammonia gas through the same partition. My absorber takes advantage of this relatively greater rate of diffusion of hydrogen through the matted porous wire structure 54 to accomplish some separation of the hydrogen gas from the ammonia gas by virtue of the relative difference in the rates of diffusion of the two gases through the wire structure 54. This separation is in addition to that accomplished by the absorption of ammonia gas into the weak ammonia solution.

This separation by diffusion makes it possible for the absorber to deliver hydrogen gas of greater purity and rich liquor of higher ammonia concentration, which results in increased overall thermal efficiency. It is not necessary that the partition 54 divide the absorber tube along the center line of the tube 52, but it may follow any other line to divide the tube 52 into two passages provided that the flow of liquor through the partition from one end to the other is substantially retained. Instead of any form of porous matted wire structure, any other form of porous metal structure or partition having capillary properties may be used, for example, porous sintered metal.

In the absorption of ammonia by the weak liquor heat is evolved and this heat is transmitted through the wire structure to the walls of the flattened absorber tube 62 which is provided with transverse fins 64 which may be of aluminum or steel, or any other suitable material, in order to expedite the carrying away of this heat. The rich liquor drips off the lower end of the matted wire structure 54 and collects in the rich or strong liquor tube 65 which extends to the combined analyzer and receiver.

The weak liquor supply tube 56, for the greater portion of its length, extends through the interior of the rich liquor tube 65 in order to form a suitable liquid heat interchanger 67. This makes it possible for the rich liquor to be delivered to the combined receiver and fractionator 34 at a comparatively high temperature. The hydrogen which remains after the removal of the ammonia from the mixture of gases flows through the passage 66 above the matted wire structure 54 to the lower end of the hydrogen supply tube 46 which connects to the heat interchanger 50. Inasmuch as some water vapor may condense within the condenser 38 and flow along with the condensed ammonia to the evaporator 42, 44, a drain tube 68 connects the lower end of the evaporator with the tube 48 so that this water may be returned to the rich liquor tube 64, which will return it to the generator 30. This drain tube 68 is provided with a trap to prevent the flow of gas through it.

Referring now more particularly to Figs. 2 and 17 to 24, the rich liquor is discharged from the rich liquor tube onto a fractionator assembly 70. This fractionator assembly 70 includes a shallow cup-shaped member 72 which fits tightly within the receiver tank and is provided with an annular shoulder 74 and a slightly dished bottom 76 provided with struck-out portions 78 which extend downwardly. The central portion of the member 72 is provided with a flange 80 which fits tightly against the walls of a vertical portion of the weak liquor tube 56. A comparatively fine screen 82 which is round and slightly dished with a hole in the center rests upon the bottom of the shallow cup-shaped member 72. Above the screen 82 is another fine screen 84 which is round and slightly dished upwardly. Its outer edges rest upon the shoulder 74 which raises the screen 84 above the screen 82 so as to provide a passage between these screens. Resting upon the screen 84 is a coarser screen 86, the central portion of which is provided with a flange fitting tightly upon the rim of a cup member 88 which in turn is provided with an interior flange fitting tightly against the inner flange 80 of the shallow cup member 72.

Also resting upon the shoulder 74 is a sheet metal disc 90 provided with a downwardly turned rim at its outer edge and a central upwardly turned rim which is spaced from the flange of the upper screen 86, so as to allow room for the passage of gas therebetween. The outer rim of the disc 90 is sufficiently high to space it sufficiently above the upper screen 86 to allow sufficient room for gas to pass between it and the screen 86. The disc 90 has an upwardly formed portion 92 forming a dam, so that the rich liquor flowing out of the end of the rich liquor tube 64 onto the disc 90 will be caused to flow in a thin sheet all the way around the disc 90 to a spout 94 which is formed in the inner flange of the disc 90 so that the rich liquor will flow from the spout 94 into the interior of the cup 88. The bottom edge of the cup 88 is provided with a plurality of apertures 96 which discharge the rich liquor between the screens 84 and 86. This rich liquor runs down within and surrounding the screens to the shoulder 74, thence from the shoulder 74 onto the screen 82. As more and more liquid flows onto the screen 82 some falls from the screen 82 into the bottom of the receiver 34 keeping the receiver normally filled with rich liquor to the level indicated by the line 98.

This rich liquor flows through the screen 101 guarding the mouths of the vapor lift tubes 103. The mouths of these tubes 103 are held within a block 105 provided in the connecting tube 107 between the receiver 34 and the generator 30. The bottom of the generator 30 is heated by the gas burner 31 and the products of combustion flow upwardly in contact with the sides of the generator. The generator 30 is normally kept filled with liquid up to the level indicated by the line 109, by the vapor lift tubes 103 which receive heat from the liquid in the generator 30 which causes a portion of the rich liquor in the vapor lift tubes to be evaporated causing the vapor lift action. The vapor lift tubes 103 discharge the vapor and liquid onto the baffle 111 which causes the liquid to run down between its corrugated surface and the side walls of the generator, while the vapor rises over the bell-shaped baffle 113 and flows into the upper end of the vapor discharge tube. The vapor discharge tube discharges into the side of the receiver tank 34 between the shallow cup member 72 and the surface 98 of the liquid. The struck-out portion 115 is twisted so as to deflect the hot vapor discharged from the tube 32 into a spiral path around the receiver and fractionator tank 34 amongst the struck-out portions 78. By this procedure some of the heat is taken away from the vapor and this heat is used to drive off some of the ammonia from the surface 98 of the rich liquor, as well as from the liquid on the screen 82. This hot vapor then flows through the four holes 117, provided in the center portion of the member 72 and then radially between the screens 82 and 84 contacting the liquid on the screen 82 beneath and the liquid flowing in the opposite direction within and surrounding the screens above. In so doing the liquid is warmed giving off ammonia vapor at the expense of water vapor in the gas which is condensed. The enriched gas then passes through the uncovered edge of screen 84 and thence passes between the disc 90 and the screen 86, warming the disc 90 above and the liquid on the screen 86 below, driving off more ammonia from the liquid above and below until it reaches the space between the flanges of the disc 90 and the screen 86 whence it is discharged to the upper portion of the receiver tank 34 and flows upwardly through the vapor conduit 36.

In Fig. 19 there is shown a modification of the analyzer in which, instead of stopping the screen 86 short of the edges of the screen 84, both the screens are extended to the shoulder 74 and provided with apertures 280 in order to allow the gas to pass through.

In the receiver tank 34, the weak liquor tube 56 is not in one continuous piece, but the portion extending vertically from the coil in the bottom of the tank 34 extends upwardly into the vapor conduit 36 and terminates there above the liquid level 109 in the generator 30. The part of the tube 56 which comes out of the rich liquor tube 64 is joined to the vertically extending part of the tube 56 within the upper portion of the receiver tank 34. By this arrangement any vapor in the tube 56 will have a chance to escape at the highest point in its circuit and will not interfere with the movement of liquid through the tube 56.

Instead of the screens shown in the fractionator assembly in the receiver tank 34, any other form of matted wire structure may be used. Also the wire used in this matted structure may be made of fine stranded wire instead of wire in the form of single threads. The wire used in the structure may be provided with a surface which will increase its capillary properties, such as an oxidized surface or an etched surface, or some form of phosphate coating. The matted wire structure 54 may be made up of layers of screen of various mesh sizes or nested or woven wire material, or of wire material packed together in a random fashion. The block 60 used to block the flow of gas through the lower passage 65 of the absorber tube 62 preferably is curled or bent over at its upper edge so that it only contacts the top surface of the matted wire structure 54. Otherwise this block 60 will drain the matted wire structure 54 and prevent it from being saturated with liquid.

Figure 5:
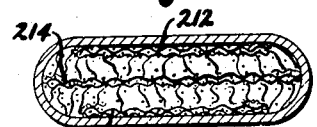
Figure 6:
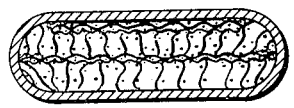

The matted wire structures shown in Figs. 5 to 11 may be substituted for the type structure shown in Figs. 1, 3, 4 and 12. In Fig. 5, a screen assembly 212 is provided at the top and the bottom of the tubing, but in addition another screen assembly 214 is provided across the middle of the tubing. This screen assembly 214 is likewise made up of coarse wire assembled to fine wire by having the edges of the fine wire folded over the edges of the coarse wire. They are held in spaced relation by a loose wire structure similar to 206 and 210. Fig. 6 is substantially like Fig. 5 with the exception that the lower screen assembly is omitted. Instead of the edges of the lower screen being folded over the edges of the upper, the two may be spot-welded together at various points.

Figure 7:
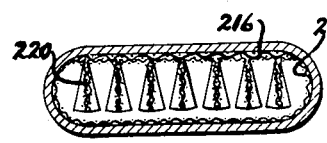

In Fig. 7, a sheet of coarse screen wire 216 is provided at the top and beneath it and on the inside walls of the tube is provided a fine screen wire structure 218 in which the portion directly beneath the coarse screen wire 216 is provided with downwardly extending folds which are corrugated so as to provide a wavy appearance from one end of the tube to the other. With this arrangement the weak liquor is discharged between the coarse and fine screens at the upper end of the absorber tube as in Fig. 1 and this liquor spreads itself out mainly between the two screens at the top and in the downwardly extending folds 220 which project into the stream of mixed hydrogen and ammonia passing through the absorber tube. The corrugated or wavy arrangement of the folds 220 of the fine screen 218 causes sufficient turbulence to increase the amount of contact between the gas and the liquid. Some of the liquid may run between the fine screen 218 and the walls of the tube down to the bottom of the tube. This, however, will only take place when the portions between the screens and the folds are fully saturated.

Figure 8:
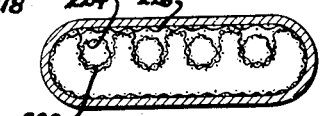
Figure 9:
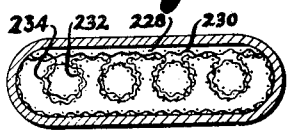

In Fig. 8, the folds 220 are replaced by downwardly extending loops 222 each of which contain a separate roll section 224 of wire screen. In this arrangement also the liquid is held between the coarse screen 226 at the top and the fine screen as well as in the loops 222. The gas flows through the tubes or roll section 224 as well as through the remainder of the flattened tube providing an extensive area of exposure between the liquid surface and gas. In Fig. 9, a somewhat similar arrangement is provided, but a space 228 is provided between the upper coarse screen 230 and the top of the tube so that gas may flow through this space and contact the upper surface of the liquid. The roll sections 232 of screen wire are more tightly held by the loops 234 which are necked in at their upper ends so as to provide the more fine screen surface and contact with the coarse screen 230. The fine screen extends around the walls of the tubing. Fig. 10 is somewhat of a compromise between Figs. 8 and 9 and shows smaller roll sections 236 inside the loops 238. In each of these structures the portions of the screens lying against the walls are relied upon to transmit the heat of absorption to the walls of the tubing.

In Fig. 11, the upper coarse screen 240 is shown spaced away from the top of the absorber tube so that gas may pass between it and the top of the tube. However, if desired, it may be placed directly in contact with the top wall surface. Directly beneath the coarse screen is a fine screen provided with a number of folds 242 which extend all the way to the bottom of the tube. Small flared U-shaped strips 243 clamp together the bottom of each of the folds 242 to provide a barrier preventing the liquid from draining from the folds 242. In this form the fine screen does not extend all the way around the walls of the tubing, but the contact of the bottom of the folds 242 of the fine screen with the bottom of the tube, together with the thinness of the space between the coarse screen and the top of the tubing are relied upon to transmit the heat of absorption to the walls of the tubing. In this form the liquid applied to the screens will fill all the spaces between the contacting screens and between the folds thereof.

In Fig. 13, is shown a double deck form of the construction shown in Fig. 11 to provide more turbulence of the gas and more extensive and more effective liquid surfaces. The upper screen 285 is held against the top of the absorber tube. This screen 285 rests upon a second screen 287 having downwardly extending folds 289 at regular intervals. These folds 289 rest upon a third horizontal screen 291 which in turn rests upon a fourth screen 293 having folds 295 at regular intervals extending downwardly into flared U-shaped metal boot strips 297 which clamp the lower ends of the folds 295. Instead of making the screen 287 with its folds 289 and the screen 293 with its folds 295 in one piece, they may be made of a series of inverted U-shaped strips of screen with their legs held together by spot-welding or by the boot strips 297, or merely by being packed together properly in the absorber tubes.

In this construction, it is contemplated that the liquid will be fed onto or between the top screens 285 and 287 to provide a film of liquid at all points between these screens as well as in the folds 289. The liquid will also run from the folds 289 onto the screen 291 and provide a film of liquid extending to all points between the screens 291 and 293 as well as all points in the folds 295. The boot strips 297 will prevent liquid from draining freely from the folds 295 onto the bottom of the absorber tube. Some liquid on the bottom of the absorber tube, however, is desirable and may be provided for by omitting a portion of one or more of the boot strips and the boot strips may be cut short at the lower end of the absorber tube where it is desirable that the rich liquor drain.

In all of these constructions shown in Figs. 3 to 13 the wire screen may be about 40 mesh either of the single strand or multi-strand wire and may be coated or etched to give it a better capillary surface. The wire and the screens may be fastened together by ferro-phosphorus sintering.

In Fig. 15, is shown a construction which may be used when the wire screen structure must be in sections, as for example, when the absorber tubing is made U-shaped. In Fig. 15, the tube 256 is provided with a pan 258 within the absorber tube 260. This pan is provided with a spout 262 which discharges the liquid from the tube 256 onto the top of the screen assembly 264. In this screen assembly 264, the edges of the screen press tightly against the side walls of the tubing as shown in Fig. 16. Instead of having the edge of one of the screens overlapping the other, both screens are folded away from each other and their edges. The liquid passes down between the screens of the screen assembly 264 to the tongue 266 at the opposite end which touches the bottom of the tube and discharges the absorption liquid thereon. The portion 268 of the tube 260 is normally provided with a U-bend as well as a lateral bend so that the second portion of the tube is lower than the first portion. A dam 270 is provided in the tube 260 so as to cause the liquid to flow through the U tube 272 which feeds the pan 274 provided between the second screen assembly 276. This pan 274 discharges between the screens and this liquid then fills the space between the screens and when saturated with ammonia is discharged from the tongue 278 into the rich liquor conduit. In this arrangement the screens may either be placed upon the horizontal center or above or below the horizontal center. I prefer to place the screens slightly above the horizontal center in order that the gas above may be forced to flow more closely to the surface of screens below it. In this figure as well as in any of the other figures, a coarse screen may be placed above a fine screen or both screens may be made alike.

Throughout this application the term gas is intended to include gases which are sometimes called vapors and also those that are sometimes called inert gases. Also the term matted wire is intended to include ordinary screen wire as well as wire which is knitted or woven together in any regular or irregular fashion as well as wire which is packed together in random fashion.

In Figs. 22 and 23 there is shown a fractionator assembly which includes the shallow cup member 372 provided with an annular shoulder 374 resting upon an annular shoulder 375 formed in the wall of the combined receiver and fractionator tank 34. Resting upon the shoulder 374 is a fine screen 384 of about 40 mesh which is slightly dished upwardly toward the center. Resting upon the screen 384 is another screen 386 which may be slightly coarser and which has an inner flange turned up about the edge of an inner cup member 388. The outer edge of the screen 386 stops short of the edge of the screen 384 so as to allow gas to pass through the screen 384 between the edge of the screen 386 and the shoulder 374. Above the screen 386 is a sheet metal disc 390 provided with a downwardly turned rim at its outer edge which rests upon the edge of the screen 384 and a central upwardly turned rim which is spaced from the flange of the upper screen 386 so as to allow room for the passage of gas therebetween.

Differing markedly from the fractionator assembly 70, shown in Fig. 2, there is provided above the disc 390 a spiral member 391 preferably cast of sintered iron or formed of some other suitable capillary material. This spiral member includes an upper horizontal wall 393 which extends between the vertical portion of the tube 56 and the vertical wall of the receiver and fractionator tank 34. Integral with this top wall 393 and extending downwardly from it to the surface of the disc 390 is a spiral vertical partition wall 395 which begins at the spout 394 of the sheet metal disc 390 and spirals outwardly until at a point just beyond the rich liquor inlet tube 64 it meets a flange 397 extending downwardly from the edge of the horizontal portion 393. The disc 390 is placed with its upper surface at the same level as the bottom of the tube 64, so that liquid will flow from the tube 64 through an aperture 364 in the flange 397 onto the adjacent portion of the disc 390 and will be directed in a very thin flat film in a spiral fashion first around the outside passage 399 between the flange 397 and the spiral 395, and thence around the second passage 402 between two sections of the spiral 395 until it reaches the spout 394 where it is discharged into the cup 388. Because of the highly capillary nature of the sintered iron or other capillary material used in the spiral member 391 it will be saturated with the liquid on the disc 390.

The cup 388 is provided with apertures 396 which direct the liquid in between the screens 386 and 384 allowing the liquid to flow to the edge of the screen 384 from which point it drops onto the outer edge of the shallow cup-shaped pan 372. This pan 372 is formed with a step which extends spirally downwardly and has a raised edge portion slightly higher than the rear portion thereof, so that the step will tend to hold liquid in a thin film thereon. This will cause the liquid in a thin film to spiral downwardly on the pan 372 until it reaches the turned down projections 373 which extend into the rich liquor indicated by the level 98, so that heat may travel from the rich liquor through the projections 373 to the pan 372. Projections 371 are turned upwardly so as to support the center of the screen 384 as well as the cup 388.

With this arrangement, the hot gas or vapor from the generator will be discharged through the tube 32 into the space between the pan 372 and the liquid level 98. The gas here will drive off some ammonia vapor from the surface of the rich liquor and this, as well as the remaining gas, will flow between the projections 373 and 371 and rise around the vertical section of the pipe 56 into the space between the screen 384 and the pan 372. Here the gas will flow radially outwardly contacting the liquid on the spiral step of the pan 372 beneath, and the liquid on the screen 384 above, in order to drive off more ammonia vapor. The gas will then pass upwardly through the outer uncovered edge of the screen 384 and thence flow radially inwardly between the screen 386 and the bottom of the disc 390. In so doing it will contact the liquid held by the screens 384 and 386 flowing in the opposite direction beneath and will warm the disc 390 above, after which it will flow between the cup 388 and the inner flange of the metal disc into the spiral passage provided by the member 391. In the spiral passages 402 and 399 the gas will contact the warmed liquid flowing in the opposite direction on the surface of the disc 390 as well as the liquid which will saturate the vertical partition wall 395 and the flange 397 as well as the upper horizontal portion 393 in the capillary member 391. The ammonia will therefore be driven out from the liquid on both of these members 390 and 391. After passing twice around the tank 34 the gas will be discharged from the spiral through the opening 404 in the horizontal wall 393 from which point it will pass into the upper part of the receiver and fractionator tank 34 to the vertical tube 36 which connects to the condenser 38. The angular portion of the weak liquor tube 56 passes from the tube 64 through the apertures 404 and 364 in the member 391 to join the vertical portion of the tube 56.

In Figs. 24 and 25 is a modification of the fractionator assembly shown in Figs. 22 and 23. In this form there is shown a shallow lower pan 472 above which are the two dished screens 484 and 486 which rest upon the shoulder 474 which in turn rests upon the shoulder 475 formed in the wall of the tank 34. The pan 472 is generally like the pan 372 excepting that it is provided with wide circular steps with raised edges so that the liquid will flow radially inwardly from one step to another instead of flowing spirally and having spiral steps as in Figs. 22 and 23. The assembly is provided with an inner cup 488 like the inner cup 388 and the disc 490 which is similar to disc 390. Above the disc 490 is a sheet metal plate 491 having a flange surrounding the vertical portion of the tube 56 and an aperture 493 through which the angular section of the tube 56 passes from the tube 65 into the tank 34. Extending between the plate 491 and the disc 490 is a strip 495 which extends around the inner rim of the disc 490 from one side of the spout to the other and then continues along the adjacent edge of the aperture 493. Also between the plate 491 and the disc 490 are two sets of two screens. The inner set designated by the reference character 451 consists of two screens having their vertical portions in contact with each other but their lower edges spread to provide flanges which extend radially inwardly and outwardly on the surface of the disc 490. The outer sets of screens 453 are similar and are provided with similar flanges. These two sets of screens 451 and 453 are positioned to divide the space between the partition 495 and the flange of the pan 472 substantially equal.

With this arrangement liquid will flow from the tube 65 onto the disc 490 and, by reason of the partition 495, will be forced to pass once around the disc before it reaches the spout. In passing around the disc it will come into contact with the bottom portion of each of the sets of screens 451 and 455 and the liquid will rise to form a film on each of these sets. At the same time the liquid will cover the top surface of the disc 490. From the spout of the disc 490 the liquid will flow through the apertures 496 of the cup 488 and between the screens 484 and 486 to the outer edge of the pan 472 and from that point will flow over the steps of the pan 472 to the point where the projections 473 are turned down into the liquid 98.

The hot gas or vapor from the generator will enter the space between the surface of the liquid 98 and pan 472. This will heat the liquid 98 and cause some of the heat to be transmitted through the projections 473 to the pan 472. The pan 472 will also be heated directly by this vapor. The vapor will then flow upwardly between the pan 472 and the screen 484 and also between the screen 486 and the disc 490 as explained previously. Thereafter the gas will pass into the space between the disc 490 and the plate 491 adjacent the spout of the disc 490 and will pass once around the tank through the passages formed between the disc 490 and the plate 491 and between the vertical partition 495 and the sets of screens 451 and 453 and the up-turned flange of the pan 472 until it reaches the aperture 493. In so doing it flows in counter-current fashion to the rich liquor flowing from the tube 64 which is presented to the gas in a very thin film on the disc 490, in order to provide the most intimate contact between the liquid and the gas so that water vapor in the gas will be replaced by ammonia vapor from the rich liquor.

In Fig. 26, there is shown a spiral form of fractionator assembly in which the bottom sheet metal member 501 may be cut from a flat sheet of steel with flanges 503 and 505 formed on its inner and outer edges and also provided with a radial cut and formed into a flat spiral. Fastened to, but spaced above the bottom of the spiral sheet metal member 501 is a set of two screens 507 and 509 which are turned upwardly at their edges and fastened by spot-welding or other suitable means to the inner and outer flanges 503 and 505 of the member 501. The screens 505 and 507 together with the member 501 form a lower assembly.

Above this lower assembly there is a second assembly which includes a second spiral sheet metal member 511 having its edges 517 and 519 bent down and outwardly as indicated. To these edges is fastened, by spot-welding or other suitable means, a second set of two screens 513 and 515. These screens 513 and 515 have their edges turned up and fastened to the downwardly turned edges 517 and 519 of the flat spiral member 511. The two spiral assemblies are so arranged that the lower end 521 of the upper assembly substantially registers with the upper end 523 of the lower spiral. In fact as is better shown in Fig. 28 the bottom end of member 521 preferably overlaps the upper end of the screens 513 and 515 while the lower end of the screens 513 and 515 overlap the upper end of the screens 507 and 509, while the lower end of the screens 507 and 509 overlap the upper end of the sheet metal member 501.

A portion of the flange 517 is cut out as shown in Fig. 28 to receive the angularly cut end 525 of the tube 65. At this particular point the screen 513 is held tightly against the bottom of the tube 65 whereas the screen 515 is turned up as shown by the reference character 527 and over the angularly cut end of the tube 65. By this arrangement the rich liquor from the pipe 65 will be fed in between the screens at the upper end of the spiral over which point it will flow downwardly between the screens 513 and 515 to their lower ends. At this point the liquid will be transferred to the upper ends of the screens 507 and 509 from which point it will flow between the screens 507 and 509 to the lower end of their flat spiral. At their lower end this liquid will be discharged onto the upper end of the sheet metal member 501 which is provided with radial grooves 529 to distribute the liquid all over the upper surface of the member 501. The centers of the screens 513, 515, 507 and 509 may be raised slightly to overcome any possible tendency for the liquid to flow downwardly too fast at their central portions.

The hot gas or vapor from the generator issuing from the pipe 32 will pass between the bottom of the sheet metal member 501 and the surface 98 of the weak liquor to the bottom end 531 of the sheet metal member 501. As shown by the arrows it will ascend the spiral, first passing between the screen 509 and the sheet metal member 501, for one turn around the tank 34 thereby contacting the liquid in the radial grooves 529 on the sheet metal member 501 as well as contacting the liquid on the bottom of the screen 509, flowing downwardly in counterflow with the gas so that ammonia is driven from the liquid at the expense of the water vapor in the gas. After this gas reaches the upper end 523 of the lower assembly it will pass between the screen 507 and the screen 513 thereby contacting the liquid in the screen 507 as well as contacting the liquid on the bottom of the screen 513. After passing the second time around the tank 34 the gas will enter the lower portion 521 of the upper assembly passing between the screen 515 and the sheet metal spiral member 511 until it reaches the upper end 533 of the upper assembly where it is discharged into the upper portion of the receiver tank 34 and passes to the generator as before.

In Figs. 29 to 31, is another modification which bears some resemblance to the modifications shown in Figs. 26 to 28. In this modification there is shown a fractionator assembly which includes a lower sheet metal disc 601 having an inner flange 603 fastened by spot-welding or other suitable means to a sleeve 602 mounted upon the vertical portion of the tube 56. The outer edge of the disc 601 is provided with a wide up-turned flange 605. Above the sheet metal disc 601 is a disc formed of an upper screen 607 and a lower screen 609 each having up-turned flanges which are fastened to the up-turned flange 605 of the sheet metal member 601 and the sleeve 602. Above the screen 607 is another set of screens 613 and 615 having up-turned flanges which are likewise fastened to the sleeve 602 and the flange 605. Above the screen 615 is another sheet metal disc 611 having up-turned flanges fastened to the flange 605 and the sleeve 602.

The sheet metal disc 601 is provided with a substantially radial cut with a downward flange 641 and an upwardly turned flange 643 to provide an opening therebetween. At the same time the set of screens 607 and 609 are cut parallel to the flange 643 and one side of the cut is provided with a downward flange 645 which overlaps the flange 643 as shown in Fig. 31. The other side of the cut is provided with an upwardly turned flange 647 while the screens 613 and 615 are provided with a downwardly turned flange 649 which overlaps the upwardly turned flange 647 as shown in Fig. 31. The other side of the cut of the screen 615 and 613 is provided with an upwardly turned flange 651 which is overlapped by the downwardly turned flange 653 of the sheet metal disc 611. The other side of the cut may be provided with an upwardly turned flange 655.

The screens 613 and 615 are arranged with the flange 649 adjacent the entrance of the tube 64 into the tank 34. These screens 613 and 615 are spread slightly at this point of entrance so that the liquid is fed in between the screens. This liquid will form a film between the screens 613 and 615 throughout their area and will then pass by means of the flanges 649 and 647 to the screens 607 and 609 and will form a film between these two screens 607 and 609 throughout their area. The liquid will finally be discharged from the screens 607 and 609 by the flange 645 and the flange 643 of the lower disc 601. This liquid will flow over the entire surface of the disc 601 and finally be discharged over the flange 641 onto the surface of the liquid 98.

The hot gas or vapor issuing from the tube 32 will pass between the disc 601 and the surface 98 of the liquid giving up some of its heat to both. This heat will drive off some ammonia vapor from the liquid on the disc 601 and some from the surface 98 of the liquid in the tank 34. This hot gas and ammonia vapor will then reach the flange 641 and pass between the flange 641 and the flange 643 to the space between the screen 609 and the disc 601. This gas and vapor will then pass once around the tank 34 between the screen 609 and the disc 611 where it will contact the liquid on the disc 601 and the liquid on the bottom of the screen 609, each flowing in the opposite direction. After this, the gas will pass between the flanges 645 and 647 to the space between the screens 607 and 613 where in passing around the tank the second time it will contact the liquid flowing in the opposite on each of these screens. It will then pass between the flanges 649 and 651 and pass again around the tank between the screen 615 and the disc 611 contacting the liquid in the screen 615. It will finally escape between the flanges 653 and 655 into the upper portion of the tank 34 over which it will be conducted to the condenser.

It will be seen that in each of these forms a long liquid path is provided in between the bottom of the tube 64 and the surface of the liquid 98 in which it flows in counterflow fashion to the vapor or gas from the generator. The use of the screens makes it possible for the film of liquid to be contacted upon its upper and lower sides by the gas. The bottom sheet metal member insures that the liquid will not be drained from the screen by the splashing from the surface 98 of the liquid in the tank. The upper covering member insures that the gas will be kept in contact with the upper face of the screen and the liquid thereon, so that maximum use of this property is made thereby. The various modifications give a wide choice in methods of manufacture and different ones or more adaptable to different forms of manufacture and different quantities. In all of them the screens should be about 40 mesh and have a wire size of from .010" to .012". Stranded wire may be used in making the screens in order to provide greater capillarity. The openings in the mesh may be increased as its capillarity increases.

While the form of embodiment of the invention as herein disclosed, constitutes a preferred form, it is to be understood that other forms might be adapted, as may come within the scope of the claims which follow.

What is claimed is as follows:

1. Gas and liquid contact apparatus for transferring a volatile substance between a gas and a liquid comprising a hollow container provided with means forming at least one passage for the flow of gas therein, said means including a wire screen structure extending substantially parallel to the general flow of gas in said passage, said structure having large areas formed entirely by two wire screen portions in continuous direct intimate area contact with each other throughout the large areas and exposed on both their non-contacting sides to the flow of the gas, said contacting portions forming a thin capillary structure capable of holding and conducting such a thin film of liquid throughout their contacting area to assure intimate contact between all of the liquid and the gas to assure maximum transfer of said substance, and means for conducting liquid to the wire screen structure adjacent its highest point, said wire screen portions being generally horizontal but slightly inclined downwardly from said highest point, and means for circulating gas in direct contact with and generally parallel to said screen portions beginning at the lowest point thereof.

2. Gas and liquid contact apparatus comprising a hollow container provided with means forming at least one passage for the flow of gas therein, said means including hollow tubular shaped portions extending longitudinally with respect to the general flow of gas, said hollow tubular shaped portions having wall portions formed of two sheet portions of wire screen material in direct area contact forming a capillary structure capable of holding a thin film of liquid, said sheet portions being exposed on their non-contacting sides to the flow of gas, and means for filling said capillary structure with a liquid.

3. Gas and liquid contact apparatus for transferring a volatile substance between a gas and a liquid comprising a hollow container provided with means forming at least one generally horizontal passageway for the generally horizontal flow of gas therein, said means including a wire screen structure having large areas extending substantially parallel to the flow of gas in said passageway formed entirely by two freely exposed generally horizontal wire screen portions in continuous direct intimate area contact with each other throughout the large areas to form a thin capillary structure capable of holding and conducting throughout their contacting area a liquid film of such thinness to assure intimate contact between all the liquid and the gas to assure maximum transfer of said substance, said two screen portions being directly exposed on both their non-contacting sides to the flow of the gas substantially parallel to their surfaces to expose to the gas both the upper and lower surfaces of the thin film of liquid, and means for conducting liquid to the wire screen structure to supply the liquid for the formation of the thin film upon said two contacting screen portions.

RICHARD S. GAUGLER.

(References on following page)

REFERENCES CITED

The following references are of record in the file of this patent:

UNITED STATES PATENTS

| Number | Name | Date |
|---|---|---|
| 236,839 | Parmenter | Jan. 18, 1881 |
| 663,699 | Latham | Dec. 11, 1900 |
| 790,933 | Talbot | May 30, 1905 |
| 833,686 | Hart | Oct. 16, 1906 |
| 863,154 | Cox | Aug. 13, 1907 |
| 989,697 | Cutter | Apr. 18, 1911 |
| 999,114 | Lang | July 25, 1911 |
| 1,042,864 | Winks | Oct. 29, 1912 |
| 1,264,935 | Hughes | May 7, 1918 |
| 1,419,867 | Laird | June 13, 1922 |
| 1,450,442 | Jones | Apr. 3, 1923 |
| 1,608,846 | Fauconnier | Nov. 30, 1926 |
| 1,903,301 | Snowden et al. | Apr. 4, 1933 |
| 2,092,810 | McLean | Sept. 14, 1937 |
| 2,265,252 | Schaefer | Dec. 9, 1941 |
| 2,268,315 | Styren | Dec. 30, 1941 |
| 2,285,089 | Higley | June 2, 1942 |

FOREIGN PATENTS

| Number | Country | Date |
|---|---|---|
| 297,139 | Germany | Mar. 26, 1917 |
| 245,254 | Great Britain | Jan. 7, 1926 |
| 537,917 | Great Britain | July 14, 1941 |